United States Patent Office 3,583,908
Patented June 8, 1971

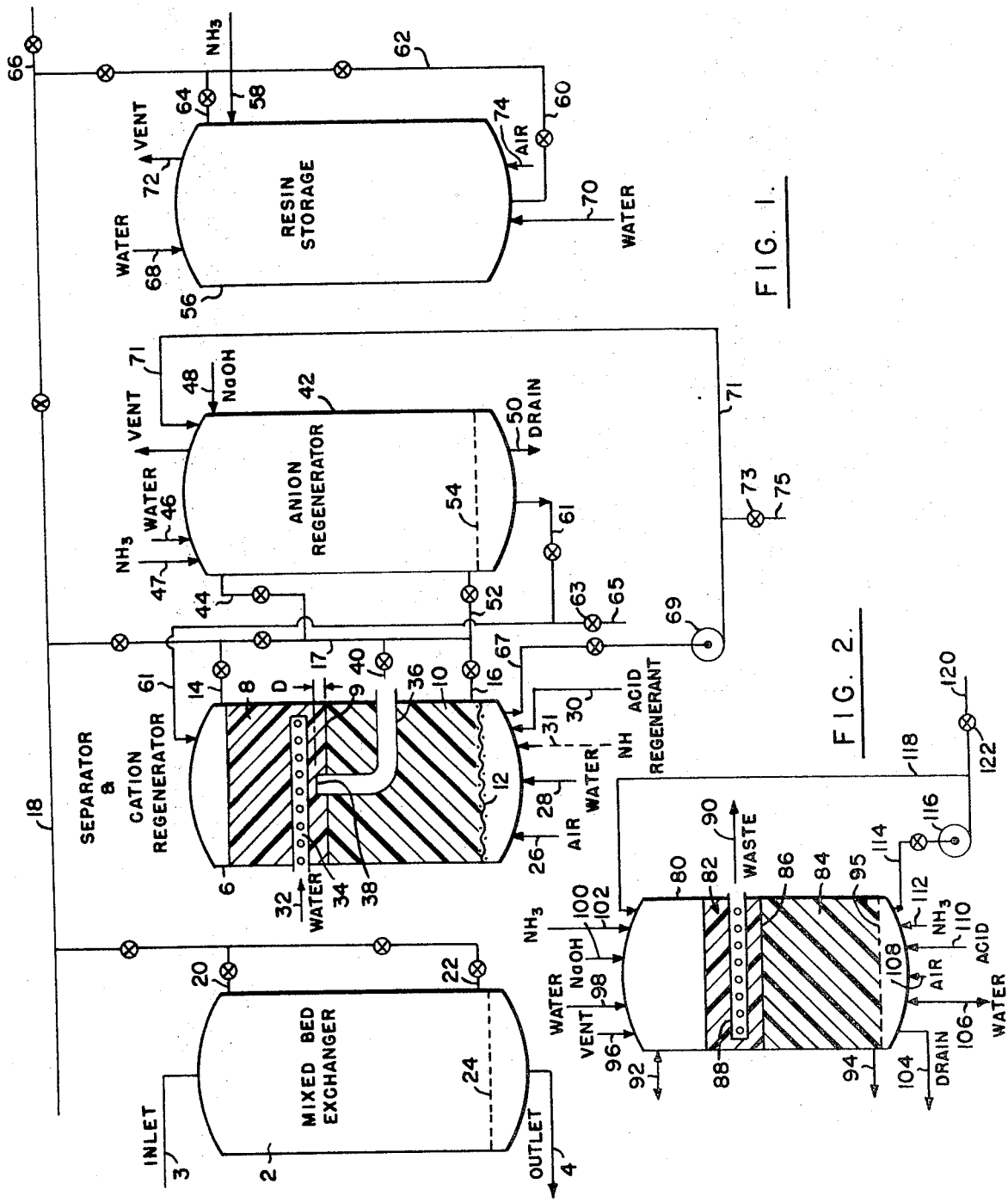

3,583,908
CONDENSATE PURIFICATION PROCESS
George J. Crits, Havertown, Pa., assignor to
Crane Co., Chicago, Ill.
Filed Sept. 25, 1968, Ser. No. 762,509
Int. Cl. B01d 15/04, 15/06
U.S. Cl. 210—32                                    7 Claims

ABSTRACT OF THE DISCLOSURE

A condensate purification process involving demineralization in a mixed bed exchanger under conditions minimizing alkali metal leakage by preventing the presence of alkali form of the cation exchange resin in the demineralizer. The resins are separated into layers and regenerated in different vessels or in the same vessel. Minor amounts of cation exchange resin are unavoidably present in the anion exchange resin during its regeneration by alkali, and the sodium form of this small amount of cation exchange resin is transformed into the ammonium form by recirculation of ammonium hydroxide through the anion exchange resin and the main body of the spent cation exchange resin before its regeneration. The sodium from the anion exchange resin is displaced into the cation exchange resin and eliminated when the latter is regenerated by acid.

CROSS-REFERENCE TO RELATED APPLICATIONS

The subject matter of this application constitutes an improvement over the subject matters of the patent to Applebaum and Crits, No. 3,414,508, dated Dec. 3, 1968, and the patent to Crits and Zahn, 3,385,787, dated May 28, 1968. The subject matter may also involve procedures disclosed in Crits application Ser. No. 699,940, field Jan. 23, 1968, and Crits Pat. No. 3,455,819 dated July 15, 1969.

FIELD OF THE INVENTION

This invention relates to a condensate purification process involving ion exchange with the maintenance of an ammonia content in a recirculatory system particularly adapted for the handling of high flow rates of the condensate. The invention is particularly applicable to steam turbine power plants.

DESCRIPTION OF THE PRIOR ART

In a steam turbine power plant system it is of great importance to provide water for steam generation which is substantially completely free of solid content which, if present, would produce coating of surfaces within the turbine and boiler and elsewhere. Even though condensate is recirculated in the system to supply a boiler, there is always accumulation of solid solutes due to the necessity for providing makeup water, possible leakage into the condenser, and solution of metal.

In accordance with the foregoing patent of Applebaum and Crits, minimizing of sodium leakage is achieved by separation of the anion exchange resin from the cation exchange resin in either of two fashions:

In one case, flows are provided under conditions in which part of the anion exchange resin is, essentially, not regenerated, the portion not regenerated being above and adjacent to the cation exchange resin and forming a barrier to lessen the possibility that any sodium will enter the cation exchange resin.

In an alternative process, the major part of the anion exchange resin is delivered to a separate vessel in which it is regenerated with caustic soda and thoroughly washed before being admixed with the cation exchange resin.

However, unless extreme precautions are taken in the matter of effecting layering of the resins, there will be an appreciable content of cation exchange resin in what should theoretically be only anion exchange resin. Therefore, when the anion exchange resin is regenerated with caustic soda, the cation exchange resin which it contains is transformed to the sodium state. Then when admixture occurs, this transformed cation exchange resin may become located throughout the mixed bed, and when the condensate containing ammonia passes therethrough some of the sodium is displaced by ammonia to enter the steam system. Under practical conditions of operation, in which extreme care cannot be exercised, and in which it is undesirable to waste too much anion exchange resin by using it to form a thick barrier, the content of cation exchange resin in the anion exchange resin may reach an amount of one percent or more. This is an appreciable amount and gives rise to sufficient sodium leakage to be objectionable in the power plant.

What has been described is improved by the adoption of an additional step in the process described in Crits and Zahn Pat. 3,385,787. In accordance with that patent the anion exchange resin either substantially isolated from, or completely separated from, the main body of the cation exchange resin (through containing the small amount of the cation exchange resin) is regenerated with caustic soda and then rinsed free of caustic soda in solution. But it is then treated with ammonia in solution using relatively high amounts and low concentrations of ammonia. The sodium form of the cation exchange resin, formed by the caustic treatment, is then transformed to the ammonia form with production of sodium hydroxide which is washed out by excess ammonia solution and then finally with water. The content of cation exchange resin transformed to the ammoniated form is then in the condition in which it should finally be, and the anion exchange resin containing the ammoniated cation resin may be returned to admixture with the major cation exchange resin to provide the mixed bed demineralizing exchanger. Because of the small amount of cation exchange resin which must be given the massive treatment with ammonia, the additional treatment is practical and economical.

SUMMARY OF THE INVENTION

The present invention improves what has been described by adoption of a different procedure. Ammonia is introduced into the anion exchange resin, but after its introduction recirculation is effected through the anion exchange resin in series with the spent cation exchange resin, the regeneration of which is deferred. By this recirculation sodium is displaced from the residual cation exchange resin contained in the anion exchange resin and enters the main body of the cation exchange resin which still has the capability of absorbing this sodium. By reason of the recirculation, the amount of ammonia necessary is substantially reduced. The recirculation is carried out for a sufficient time to reduce to a desired degree leakage of sodium from the anion exchange resin, the sodium form of the cation exchange resin contained in the anion exchange resin being converted, to a major extent into the ammonium form.

The cation exchange resin is then regenerated by acid and rinsed, whereby sodium is substantially completely removed from the system. Both resins are then mixed to provide the mixed bed for demineralization.

BRIEF DESCRIPTION OF THE DRAWINGS

FIG. 1 is a flow diagram illustrating a preferred system provided in accordance with the invention; and FIG. 2 is a diagram showing a separator and regeneration vessel which may be used in accordance with another embodiment of the invention.

DESCRIPTION OF THE PREFERRED EMBODIMENTS

Referring to FIG. 1, a plurality of mixed bed exchangers are used, operating in parallel, exhaustion taking these exchangers out of operation in sequence for short periods of time as will appear hereafter. The invention is applicable particularly to demineralization of a steam turbine power plant, and typically the demineralized output from the exchangers will be supplied through heat exchangers to a boiler providing steam to a turbine exhausting into a condenser. The condensate enters the exchangers to which make-up water is also fed. A single mixed bed exchanger is illustrated at 2, but it will be understood that usually this will be only one of a plurality of such exchangers operating in parallel. From the standpoint of the present invention, operations with respect to one exchanger only need be described. The on-stream inlet and outlet connections are indicated at 3 and 4. In general, in this figure, connections are primarily conventionalized with some valves indicated, but with pumps and other auxiliary devices omitted. Actual connections may take many forms and it will be readily understood by those skilled in this art that proper connections are provided to produce the various flows which will be described.

The exchangers are not called upon to take part in the actual regeneration (and accordingly may be active for longer duty cycles), but regeneration uses auxiliary tanks, the principal one of which is the separator and cation regenerator 6. This is illustrated as in a condition containing both the anion exchange resin 8 and the cation exchange resin 10 in separated condition, the interface being indicated at 9. The respective resins are of different specific gravities as is usual when stratification is desired, the anion exchange resin being lighter than the cation exchange resin. Various resins may be used. The anion exchange resin is of the hydroxyl type adapted to be regenerated by caustic soda, while the cation exchange is of the hydrogen type, adapted to be regenerated by a strong acid, such as sulfuric acid, though in the present instance it is used in ammoniated form as will presently appear. The usual support, conventionalized as a screen 12, prevents outflow of the resins from the bottom of the tank. Pipe connections 14 and 16 are connected to pipe 17 running to a line 18 through which, as will be indicated later, the resins are caused to flow in aqueous suspension.

Each of the exchangers is provided with upper and lower passages 20 and 22 for inflow and outflow of the resins, the resins being carried on the support 24 which may take many of the usual conventional forms to prevent outflow of the resins with the water being treated. The connections 20 and 22 run with suitable valving to the line 18. The separator 6 is provided with inlets 26, 28 and 30, respectively for air, water and acid regenerant. Drain and vent connections of conventional type are not illustrated.

A connection 32 for introduction of water communicates with a distributor 34 which may consist of an array of pipes containing perforations preventing outflow of resins. A sluice 36 is shown in the form of an elbow with the upper open end 38 located below the distributor 34 and preferably at a level such as indicated spaced by a dimension D above the normal interface 9 between the anion and cation exchange resins when they are stratified. This dimension may range, desirably, from about one inch to three inches. A greater value for D is generally unnecessary and merely represents some wastage of anion exchange resin 8. The dimension D is merely to insure a minimum percentage of cation exchange resin in the anion exchanger region of the separator.

In practical operation, the interface 9 may well be rather indefinite, there being in the vicinity of the interface some admixture of the resins, with conditions varying in successive steps of operation.

The sluice 36 communicates at 40 through a valve with the upright pipe 17.

The anion exchange resin is regenerated separately from the cation exchange resin, and for this purpose there is provided the separate regeneration vessel 42, the upper end of which is connected at 44 through a valve with the line 17. Water may enter the top of the vessel 42 at 46, and ammonia in aqueous solution may enter at 47. At the top of the vessel there is also provided the line 48 for entry of caustic regenerant. A drain 50 is indicated. At 52 there is a valved connection between the lower portion of the vessel 42, above the perforated support 54, and the pipe 17.

There is also desirably provided a separate resin storage tank 56 for temporarily holding the mixed resins which have been regenerated. At the top of the tank there is provided an inlet 58 for ammonia (in aqueous solution) and at the bottom of the tank there is an outlet 60 connecting through pipe 62 to the line 18 previously mentioned. The top of the tank is connected at 64 to the same line. Suitable valving is provided. The line 18 has a valved drain connection 66. Additionally illustrated are water connections 68 and 70 respectively at the top and bottom of the tank, a vent connection 72, and a lower air inlet connection 74.

What has been so far described is apparatus and connections disclosed in said Crits and Zahn patent. In accordance with the present invention there are provided other connections and elements for the ammonia recirculation and sampling as follows:

A valved connection 61 runs from the bottom of the anion regenerator 42 to the top of the separator 6. A sampling connection is provided by a valve 63 to a pipe 65 for the withdrawal of samples to ascertain the sodium leakage and ammonium concentration issuing from the anion regenerator. A valved connection 67 from the bottom of the separator 6 runs to a pump 69 which delivers the recycled ammonia through connection 71 to the top of the anion regenerator 42. From the line 71 there runs the sampling connection 75 provided with a valve 73 for the purpose of sampling for measurement of sodium and ammonia concentration.

Operation is as follows:

When one of the battery of exchangers requires regeneration, it is taken off the line and the mixed resins therein are transferred through the outlet 22 and by way of the line 18 into the empty separator 6 through the connection 14. When this transfer is completed, resin from the storage tank 56, in the regenerated state, may be immediately transferred by way of connection 60 and lines 62 and 18, and connection 20, into the exchanger and it may be put back into active operation. By this arrangement the down-time of any exchanger is minimized and it need not be out of operation during the regeneration of its resins.

The mixed resins in the separator are desirably first backwashed while in the mixed state, to separate the resin granules and to remove the solids which were filtered out during on-stream operation. The backwashing may comprise upward flow of water at suitable velocity, alternating with drainage and air flow to produce scrubbing. After the solids, including metal oxides, are effectively removed, the water flow may be stopped as usual to provide sedimentation of the resins and their stratification to the condition illustrated in FIG. 1, in which the anion exchange resin 8 overlies the cation exchange resin 10 with the interface 9 located, preferably, below the open end 38 of the sluice 36, the spacing involving the dimension D previously described.

The scrubbing may alternatively be carried out in accordance with the procedure described in Crits Patent No. 3,455,819.

The next step involves transfer of the anion exchange resin 8 to the anion regenerator 42. This is effected by opening the connections at 40, 17 and 44 to provide delivery of the resin, water being introduced at 32 to provide fluidizing of the resin 8 so that the fluent suspension will flow through the sluice 36. That portion of resin above the level 38 will thus be transferred, the small amount between the top of the sluice and the interface 9 remaining in the separator 6. What is desired here is a transfer of the anion exchange resin with a minimum content of the cation exchange resin.

Following the transfer of the resin 8, separate regenerations of the two resins are effected, but in accordance with the present invention the regeneration of the cation exchange resin is deferred.

The anion exchange resin is regenerated in the vessel 42 by treatment with caustic soda entering at 48. This part of the regeneration is carried out in conventional fashion utilizing the proper amount of caustic soda, and then thorough rinsing is effected to remove the caustic soda in solution.

Despite careful stratification and the presence of a barrier portion of the anion exchange resin in the region having the dimension D, it is practically impossible to eliminate all cation exchange resin from the anion exchange resin which is treated in the anion regenerator 42. The stratification is not even perfect with respect to resin particles of normal size; but inevitably there are fines of cation exchange resin which, because of their small size, settle more slowly, and these remain in the anion exchange resin. In practical operation it is difficult to reduce the percentage of cation exchange resin in the material in the anion regenerator below about one percent, and several percent may ordinarily be present. In the regeneration with caustic soda, this residual cation exchange resin is transformed to its sodium state. The affinity of cation exchange resin for sodium and for ammonium is sufficiently close that during on-stream operation with the condensate containing ammonia, appreciable amounts of the sodium will be displaced to appear in the treated water. This is particularly true when it is considered that the resins are mixed in the exchangers and therefore appreciable amounts of the sodium form of the cation exchange resin will be near the bottom of the mixed bed. In accordance with the disclosure of the Crits and Zahn patent, after regeneration by the caustic soda and rinsing, ammonia in aqueous solution was introduced at 47 and the effluent discarded through the drain 50. By massive treatment by ammonia at this point, the ammonium replaced the sodium to reduce the sodium content to a negligible amount.

This treatment involved a considerable loss of ammonia.

In accordance with the present invention saving of ammonia is achieved as follows:

Following the rinsing out of the caustic soda in solution, the connections 61 and 67, 71 are opened with operation of pump 69, and a limited amount of ammonia in suitable concentration is introduced at either 47 or 31, followed by recirculation by the pump 69 through the vessels 42 and 6 in series. By reason of this recirculation, the ammonia gradually removes the sodium from the cation exchange resin in the anion exchange resin contained in the vessel 42, and this sodium accumulates in the cation exchange resin in the vessel 6. While this cation exchange resin is exhausted from the standpoint of on-stream operation, and is due for regeneration, it still retains substantial ability to absorb sodium. The recirculation is carried out until tests of samples withdrawn at 65 indicate that there is adequately low leakage of sodium from the anion regenerator, which means that the residual cation exchange resin has been adequately transformed to its ammonium form, which is the form which is ultimately desired in any event. Tests of samples withdrawn at 75 will furnish further indications of the conditions involved and of the ammonia concentration in the recirculated liquid.

After the desired conditions are achieved, the cation exchange resin 10 is regenerated in the separator 6 by the upward or downward flow of acid regenerant (usually sulfuric acid solution). Following this, the usual rinsing may be effected either by downflow of water from the connection 32 or upflow from the connection 28. The rinsing water is discharged in the usual fashion. This regeneration removes from the system the sodium which originated in the cation exchange resin dispersed through the anion exchange resin. The cation exchange resin 10 is thus left in its hydrogen state; but if desired it may be ammoniated by introduction of ammonia in solution at 31.

Following the regeneration of both resins, the anion exchange resin being in its hydroxyl state, and the entrained cation exchange resin being primarily in its ammoniated state, and the cation exchange resin being either in its hydrogen form or its ammonium form, if the latter is produced, both of them are caused to flow into the resin storage tank 56 by connections which will be obvious. As introduced into this tank, the two resins may be substantially separated; but by the introduction of water and air under conditions of reasonably violent flow, good admixture may be obtained.

After admixture is achieved, it is desirable to effect ammoniation of the cation exchange resin, and for this purpose ammonium hydroxide may be introduced at 58 if ammoniation had not formerly occurred in tank 6. However, this ammoniation may be deferred, the mixed resins being delivered to an exchanger 2 with ammoniation either effected therein or, gradually, by adding ammonia to the system at any suitable point. Ultimately the cation exchange resin will be in its ammoniated state.

Through the use of the storage tank 56, there is provided a receptacle for the regenerated resins, despite the fact that the exchanger from which the resins were obtained is back in use. This leads to the more effective duty cycle of the exchangers.

However, it will be evident that the vessel 6 could have its functions provided by suitable construction of a mixed bed exchanger; i.e., each mixed bed exchanger could function as the separator and cation regenerator. A separate anion regenerator could be provided as described, and after anion regeneration was effected therein the anion exchange resin could be transferred back to the mixed bed exchanger in which mixing could be effected. In such case the resin storage tank would be unnecessary. However, it will be evident that the mixed bed exchanger would then, for best results, have a more elaborate construction as illustrated for the separator 6, and generally operation in this last fashion is not desirable.

If it is permissible to have one of a battery of mixed bed exchangers out of operation for a more prolonged period, the resin storage tank may be eliminated, the resins after regeneration being returned to the exchanger from which they came, with admixture therein.

Another alternative operation may involve regeneration of both resins in the same separation vessel, and the use of this procedure is exemplified in FIG. 2. In that figure the separator and regeneration vessel 80 may be regarded as replacing both of the vessels 6 and 42 of FIG. 1, with the understanding that the vessel 80 is associated with a bank of mixed bed exchangers 2 and with a resin storage tank 56.

The vessel 80 is shown as containing the layered anion exchange resin 82 and cation exchange resin 84, separated by the interface 86. Located within the anion exchange resin is a collector 88 which may take the form of a network of pipes having small perforations preventing outflow of resin particles to a waste connection 90. The collector 88 is located above the interface 86, being spaced thereabove to the same extent as the open upper end 38 of the sluice 36 was spaced above the corresponding interface in FIG. 1, i.e., about one inch in the case of tanks of small cross-section up to about three inches for larger tanks, i.e., the spacing D to provide a barrier layer of the anion exchange resin to minimize content of cation exchange resin in the upper layer.

The upper end of the vessel 80 is provided with a connection 92 which may involve inflow and outflow during operation, there being also provided the outflow connection 94 above the support 95 which holds the resins but permits inflow and outflow of liquids. The connection 94 functions primarily for the removal of the resins.

At the upper end of the vessel 80 there are indicated various flow passages which, of course, can be constituted by a single or a less number of passages with obvious valving, the passages being indicated as independent to simplify description of operation. The passages comprise the vent 96, a water inflow passage 98, a caustic regenerant passage 100, and an ammonia passage 102.

At the bottom of the vessel below the resin support 95 there are indicated individual passages which also may be provided by a single passage with suitable valving. The passages indicated are the drain 104, the passage 106 for upward or downward flow of water, the air passage 108, acid regenerant passage 110, and ammonia passage 112.

For the purpose of the present invention a recirculation system is provided involving the connection 114 from the bottom of the vessel running to a pump 116 which, through connection 118 provides delivery of ammonia solution to the top of the vessel 80. A sampling connection 120 controlled by a valve 122 may take samples from the connections 114, 118. Additional sampling may be from the outlet 88.

The operation of this modification is as follows:

The vessel 80 is empty between regenerations. When one of the exchangers of the bank requires regeneration of its resins, it is taken out of service and the mixed resins therefrom are delivered to the vessel 80. Immediately after this, the emptied exchanger may receive a new charge of mixed resins from the storage vessel and be restored to service. This is as described with reference to FIG. 1.

The next operation is backwashing and scrubbing of the resins now contained in vessel 80, still in mixed form. For this purpose water is entered at 106 and discharged through connection 92, then connected to waste. Water flow may be alternated with introduction of air to insure good cleaning, this involving removal of dirt including metal oxides separated by the filtering action in the exchanger. The alternative scrubbing procedure of Crits Patent No. 3,455,819 may be used.

Following this washing and scrubbing the water flow is stopped to provide the settling and stratification of the resins, which attain the state indicated in FIG. 2 with a fairly well defined interface 86. The anion exchange resin as described in connection with the previous modification, will contain even above the level of the piping 88 some cation exchange resin in the nature of fines as well as some entrained particles of larger size.

Regeneration of the anion exchange resin is effected by producing downward flow of the caustic regenerant through the passage 100, this caustic regenerant flowing outwardly to waste through the connection 90. To prevent as far as possible entrance of the caustic regenerant into the cation exchange resin, it is desirable to provide an upward flow of water through connection 106 which water also flows out through connection 90. This prevents substantial regeneration of the portion of the anion exchange resin between the collector 88 and the interface 86, but this waste of the anion exchange resin can be tolerated for the sake of prevention of entrance of sodium into the cation exchange resin.

The next step is rinsing with water entering at 98 while maintaining the barrier flow of water through 106; both flows pass through connection 90 to waste. This gets rid of excess sodium hydroxide.

The small amount of cation exchange resin in the region 82 will now be in its sodium form which is objectionable as previously discussed.

Treatment with ammonia now takes place. The required amount of ammonia is introduced at 102 (or 112) and then recirculation is effected by opening the connections 114 and 118 and operating the pump 116. The effect is substantially what has been described in connection with FIG. 1: the ammonia is recirculated through the anion exchange bed 82 and the cation exchange bed 84, in series, displacing sodium from the cation exchange resin dispersed through the bed 82, with absorption of the sodium in the cation exchange bed 84 which still retains the capability of such absorption. During this recirculation the waste outlet 90 is closed except for the possible withdrawal of samples to indicate the amount of residual sodium leakage from the bed 82. Samples may also be withdrawn at 120 to test the adequacy of the ammonium content and leakage of sodium from the bottom of bed 84.

After the recirculation is terminated, and the recirculation connections closed, a water rinse of the beds is desirable.

The next step involves the regeneration of the cation exchange resin 84, and this may be carried out in usual fashion with sulfuric acid introduced at 110. Excess regenerant is caused to flow out through the waste connection 90, while barrier water is caused to flow downwardly from connection 98 through the upper portion of the anion exchange resin. This serves for further rinsing of the anion exchange resin.

The acid regeneration will remove the sodium accumulated in the cation exchange bed 84 and also what may exist in the portion of the bed 82 below the outlet 90.

Following the acid regeneration, rinse water is caused to flow through connection 106 while the barrier flow through connection 98 is continued, the flow being outward through connection 90.

While as indicated above, ammoniation of the cation exchange resin may be effected otherwise, the last rinsing step may be followed by upward flow of ammonium hydroxide through connection 112 to ammoniate the bed 84.

Following this, mixing may be effected, and the mixed resins may then be delivered from the vessel 80 to the resin storage tank. The mixing may be effected in the latter if desired, and the ammoniation may be effected therein.

Alternatives to what has been described may involve the elimination of the resin storage tank. In such case, the exchanger may be kept inoperative during regeneration of its resin, and after regeneration as described, the mixed resins may be returned to the exchanger.

Still another modification may involve the construction of each exchanger to provide regeneration in itself, there being provided the collector arrangement as at 88, this, during on-stream operation, being closed off. In such case, of course, on-stream connections would be involved in addition to those indicated in FIG. 2.

In the foregoing procedural sequences have been described without particular references to concentrations, quantities of materials, or the like. These factors are essentially common to the alternative procedures which have been described and may, accordingly, be considered as a unitary matter.

The regeneration of the anion exchange resin by sodium hydroxide (or other alkali) may be carried out in a fashion generally conventional, and, as is conventional, the amount of sodium hydroxide used may vary from about twelve to fifteen pounds per cubic foot of the anion exchange resin. This amount may vary to a great extent depending upon particular circumstances involved as will be evident to those skilled in the art, and concentrations of the sodium hydroxide are quite arbitrary. The particular conditions of regeneration are not of substantial relevance to the matters involved in the present invention. For proper results it is important that the rinsing following the regeneration of the anion exchange resin should be carried out sufficiently to minimize sodium in solution, and the completeness of effective rinsing may be determined in the usual fashion by measurement of the conductivity of the effluent.

The conditions involved in the recycling of the ammonium hydroxide are susceptible to a wide range of choice, but typically the following may be cited as examples of what have been found to be optimum conditions:

The concentration of the ammonium hydroxide (as $NH_3$) may well be in the range of 0.1% to 3.0%, through these limits may be exceeded. Highly effective concentrations have been found to be in the range of 0.2% to 0.6%.

The quantity of $NH_3$ may be of the order of one hundred pounds or less per cubic foot of the cation content in the anion exchange resin.

The recirculation rate of the ammonium hydroxide may be of the order of three to ten gallons per minute per square foot of horizontal cross section of the anion resin bed. Here also the rate may well exceed these limits; if less, the recycling may occupy a longer time; if more, the rate may be such that the lessening of the time of recycling may not be significant.

Recycling is generally desirably continued for a time necessary to reduce the sodium leakage from the anion exchange resin to one part per million or less, depending upon what is desired.

The conditions just described have been found to result in recycling for periods of the order of five to twelve hours. Conditions involved may be in accordance with the disclosure of Crits application Ser. No. 699,940, referred to above.

The amount of ammonium hydroxide required in accordance with the invention is much less than that required if the anion exchange resin is treated without recycling through the spent cation exchange resin. If the recycling is not used, the ammonium hydroxide, containing sodium, must be run to waste, since in passing through the anion exchange resin much of it is not effective to displace sodium, whereas if recycling is used the effective contact of the ammonium hydroxide with the sodium form of the entrained cation exchange resin is increased.

The regeneration of the cation exchange resin by sulfuric or other acid may be carried out in usual fashion, i.e., using around fifteen pounds of sulfuric acid per cubic foot of the cation exchange resin, or the equivalent of other acid.

I claim:

1. In a water purification process involving flow of water through a demineralizer containing mixed anion exchange resin granules and cation exchange resin granules of different densities, the steps of separating the resins into two beds one of which contains anion exchange resin granules entraining a minor amount of cation exchange resin granules and the other of which contains the major part of the cation exchange resin granules, regenerating with alkali only the first mentioned bed, rinsing alkali from the first mentioned bed, recirculating ammonia through both beds in series to effect displacement of alkali metal from the entrained cation exchange resin granules into the second mentioned bed, regenerating with acid the second mentioned bed, and removing excess of acid regenerant from the second mentioned bed.

2. The process of claim 1 in which the granules of cation exchange resin have a higher specific gravity than those of the anion exchange resin, in which the separation of the resins provides a lower layer of primarily the cation exchange resin granules and an upper layer of primarily the anion exchange resin granules with upper and lower portions of said upper layer, with the lower portion of minor volume located above the lower layer to isolate the upper portion therefrom, said upper portion forming said first mentioned bed, and at least said lower layer forming the second mentioned bed.

3. The process of claim 2 in which the alkali regeneration of the first mentioned bed is effected while it is isolated from said lower portion of the upper layer.

4. The process of claim 2 in which the alkali regeneration of the first mentioned bed and the subsequent treatment with ammonia are effected while the granules of that bed rest on said lower portion of the upper layer.

5. In a water purification process involving flow of water through a demineralizer containing anion exchange resin granules, and cation exchange resin granules of relatively higher density than the anion exchange resin granules, the steps of separating the resins into two beds with the cation exchange resin granules forming the lower bed and the anion exchange resin granules along with a small amount of entrained cation exchange resin granules forming the upper bed, regenerating with alkali the anion exchange resin granules of the upper bed, treating with ammonia the regenerated anion exchange resin granules while separated from the lower bed to displace, by ammonium, sodium from the cation exchange resin entrained with the anion exchange resin, said treatment with ammonia involving recirculation of the ammonia through both beds in series, then regenerating with acid the cation exchange resin granules of said lower bed, removing excess of acid regenerant from said lower bed, and ammoniating the cation exchange resin granules regenerated with acid.

6. The process of claim 5 in which the alkali regeneration of the anion exchange resin granules of the upper bed and the subsequent treatment thereof by ammonia are effected while the granules of that bed are isolated from the lower bed.

7. The process of claim 5 in which the alkali regeneration of the anion exchange resin granules of the upper bed and the subsequent treatment thereof by ammonia are effected while the granules of that bed rest on the lower bed.

References Cited
UNITED STATES PATENTS

| | | | |
|---|---|---|---|
| 3,385,787 | 5/1968 | Crits et al. | 210—32 |
| 3,414,508 | 12/1968 | Applebaum et al. | 210—37X |
| 3,438,891 | 4/1969 | Schmidt et al. | 210—32 |

SAMIH N. ZAHARNA, Primary Examiner

U.S. Cl. X.R.

210—35